United States Patent
Miserendino et al.

(10) Patent No.: US 10,977,571 B2
(45) Date of Patent: Apr. 13, 2021

(54) SYSTEM AND METHOD FOR TRAINING MACHINE LEARNING APPLICATIONS

(71) Applicant: BluVector, Inc., Philadelphia, PA (US)

(72) Inventors: Scott B. Miserendino, Baltimore, MD (US); Donald D. Steiner, McLean, VA (US); Ryan V. Peters, Elkridge, MD (US); Guy B. Fairbanks, Centreville, VA (US)

(73) Assignee: BluVector, Inc., Philadelphia, PA (US)

( * ) Notice: Subject to any disclaimer, the term of this patent is extended or adjusted under 35 U.S.C. 154(b) by 1045 days.

(21) Appl. No.: 14/635,711

(22) Filed: Mar. 2, 2015

(65) Prior Publication Data

US 2016/0260023 A1 Sep. 8, 2016

(51) Int. Cl.
*G06N 3/12* (2006.01)
*G06N 20/00* (2019.01)

(52) U.S. Cl.
CPC .............. *G06N 20/00* (2019.01); *G06N 3/12* (2013.01)

(58) Field of Classification Search
None
See application file for complete search history.

(56) References Cited

U.S. PATENT DOCUMENTS

| | | | |
|---|---|---|---|
| 8,682,812 B1 | 3/2014 | Ranjan | |
| 2003/0051026 A1* | 3/2003 | Carter | H04L 41/00 709/224 |
| 2004/0088680 A1 | 5/2004 | Pieper et al. | |
| 2006/0277170 A1 | 12/2006 | Watry et al. | |

(Continued)

FOREIGN PATENT DOCUMENTS

| | | |
|---|---|---|
| JP | 2002-133389 A | 5/2002 |
| JP | 2005-182696 A | 7/2005 |

(Continued)

OTHER PUBLICATIONS

Trevino, et al.,Galgo, An R package for Genetic Algorithm Searches (Customized for Variable Selection in Functional Genomics), School of Biosciences, University of Birmingham, 2006, pp. 1-88.*

(Continued)

*Primary Examiner* — Wilbert L Starks
(74) *Attorney, Agent, or Firm* — BakerHostetler

(57) ABSTRACT

Digital object library management systems and methods for machine learning applications are taught herein. Such a method includes populating a digital object library with a number of machine readable digital objects, modifying the digital objects to include additional machine readable data about the digital objects or other digital objects and the relationships among existing digital objects, generating lists of objects for use in construction and verification of machine learning models used to classify unknown objects into one or more categories, building queries to generate object lists, initiating model generation, in which a machine learning model used to classify unknown objects into one or more categories is generated, initiating model evaluation, storing models, object lists, evaluation results, and associations among these objects, generating a visual display of object metadata, lists, relational information, and evaluation results and running distributable algorithms across the library of digital objects.

23 Claims, 4 Drawing Sheets

(56) References Cited

U.S. PATENT DOCUMENTS

| | | |
|---|---|---|
| 2010/0256988 A1 | 10/2010 | Barnhill et al. |
| 2012/0191630 A1 | 7/2012 | Breckenridge |
| 2014/0046880 A1 | 2/2014 | Breckenridge et al. |
| 2014/0090061 A1 | 3/2014 | Avasarala |

FOREIGN PATENT DOCUMENTS

| | | |
|---|---|---|
| JP | 2006-285982 A | 10/2006 |
| JP | 2007-157058 A | 6/2007 |
| JP | 2014-071493 A | 4/2014 |

OTHER PUBLICATIONS

Odberg, MultiPerspectives: Object Evolution and Schema Modification Management for Object-Oriented Databases, Doctoral Thesis, Norwegian Institute of Technology, 1995, pp. 1-422 (Year: 1995).*

Laskov, et al., Static Detection of Malicious JavaScript-Bearing PDF Documents, Twenty-Seventh Annual Computer Security Applications Conference, ACSAC 2011, 2011, pp. 373-382 (Year: 2011).*

Chu, et al., Map-Reduce for Machine Learning on Multicore, Advances in neural information processing systems, 19, 2006, pp. 281-288 (Year: 2006).*

Mejia, Carolina, et al., "Supporting Competence upon DotLRN through Personalization", University of Girona, Insitute of Informatics Applications, Spain, pp. 1-7, undated.

Blum, Avrim, et al., "Selection of relevant features and examples in machine learning", Artifical Intelligence., vol. 97, pp. 245-271 (1997).

Raman, Baranidharan, et al., "Enahncing Learning Using Feature and Example Selection", Journal of Machine Learning Research, pp. 1-37 (2003).

Huang, Jiayuan, et al., "Correcting Sample Selection Bias by Unlabeled Data", 8 pages, undated.

Han, Hui, et al., "Borderline-SMOTE: A New Over-Sampling Method in Imbalanced Data Sets Learning", ICCIC, Part I, LNCS, pp. 878-887 (2005).

File History of U.S. Appl. No. 14/038,682, filed Sep. 26, 2013.

International Search Report Issued in International PCT Application PCT/US2015/043828 dated Dec. 29, 2015.

European Extended Search Report for EP15884155.1 dated Sep. 27, 2018, 8 pages.

International Preliminary Report on Patentability received for PCT Patent Application No. PCT/US2015/043828, dated Sep. 14, 2017, 6 pages.

\* cited by examiner

SYSTEM AND METHOD FOR TRAINING MACHINE LEARNING APPLICATIONS

BACKGROUND

The existing state of the art in digital object management systems have no specialization for the support of machine learning processes. Digital object management systems typically tend to be used by large library systems to expose digital documents to their users. What is needed is a system that addresses the challenge of conducting supervised machine learning in a "big data" environment where hundreds of thousands to billions of training and test examples need to be considered and managed. This is a historically new regime for machine learning which typically has operated in environments where training data was limited relative to training computational resources (i.e., if you had the data to train on, the trainer could handle it in a reasonable period of time). With automated data sources being used to feed machine learning algorithms, the performance of learning algorithms now limits the number of examples and/or features that can be used.

This new operating regime forces a user to choose which samples to use. Naïve approaches, such as random selection from the corpus, preserve collection bias and can adversely affect results. As a result there is a need for users to understand and control training sample bias.

Today, digital objects for machine learning are typically stored in a hierarchical file system. The file storage may be shared but is often limited to one user's machine. Supervised machine learning training and test lists are typically manually generated over a relatively small number of samples and/or objects. As machine learning technologies are incorporated into "big data" environments, they will need to manage millions to billions of samples. Machine learning is typically scripted or manually executed. Training and test results are often stored in the same hierarchical file system as the data objects. Often no relational metadata is maintained. If data is maintained it is implied through collocation of the results, training, and test lists with the classifier in the directory structure or in manually maintained spreadsheets.

Existing machine learning patents cover learning algorithms and processes used by machine learning techniques, but do not cover the preparation and managements of the inputs and outputs of the machine learning system.

SUMMARY

Embodiments include a digital object library management system and method for machine learning applications that overcome the disadvantages of the prior art. For example, embodiments provide a system that addresses the challenge of conducting supervised machine learning in a "big data" environment where hundreds of thousands to billions of training and test examples need to be considered and managed. Additionally, embodiments enable users to understand and control training sample bias.

These and other advantages are provided by the integration of a digital object library management (DOLM) system with a cloud storage solution. The DOLM supplies the ability to track and manage large numbers of objects and associated metadata including relational metadata among the objects. The cloud storage solution enables the distributed processing of analytics and metadata extraction across the library.

These and other advantages are also provided by a digital object library management method for machine learning applications includes populating a digital object library with a number of machine readable digital objects, modifying the digital objects to include additional machine readable data about the digital objects or other digital objects and the relationships among existing digital objects, generating lists of objects for use in construction and verification of machine learning models used to classify unknown objects into one or more categories, building queries to generate object lists, initiating model generation, in which a machine learning model used to classify unknown objects into one or more categories is generated, initiating model evaluation, storing models, object lists, evaluation results, and associations among these objects, generating a visual display of object metadata, lists, relational information, and evaluation results and running distributable algorithms across the library of digital objects.

These and other advantages are also provided by a system for managing digital object libraries used for training and testing of machine learning model. The system includes a digital object library management system (DOLMS) server that is used to manage the storage, creation and modification of digital objects used for training and testing machine learning models. The DOLMS server further includes a digital object repository (DOR), graphical user interface (GUI) software, a database and distributed analytic modules. The system further includes a test and training cluster of computers used to train and test the machine learning models and a storage cluster of computers used to store the digital objects in one or more digital object libraries.

BRIEF DESCRIPTION OF THE DRAWINGS

Embodiments of a digital object library management system and method for machine learning applications are understood and described in conjunction with the following drawings, wherein.

DETAILED DESCRIPTION

Figure 1:
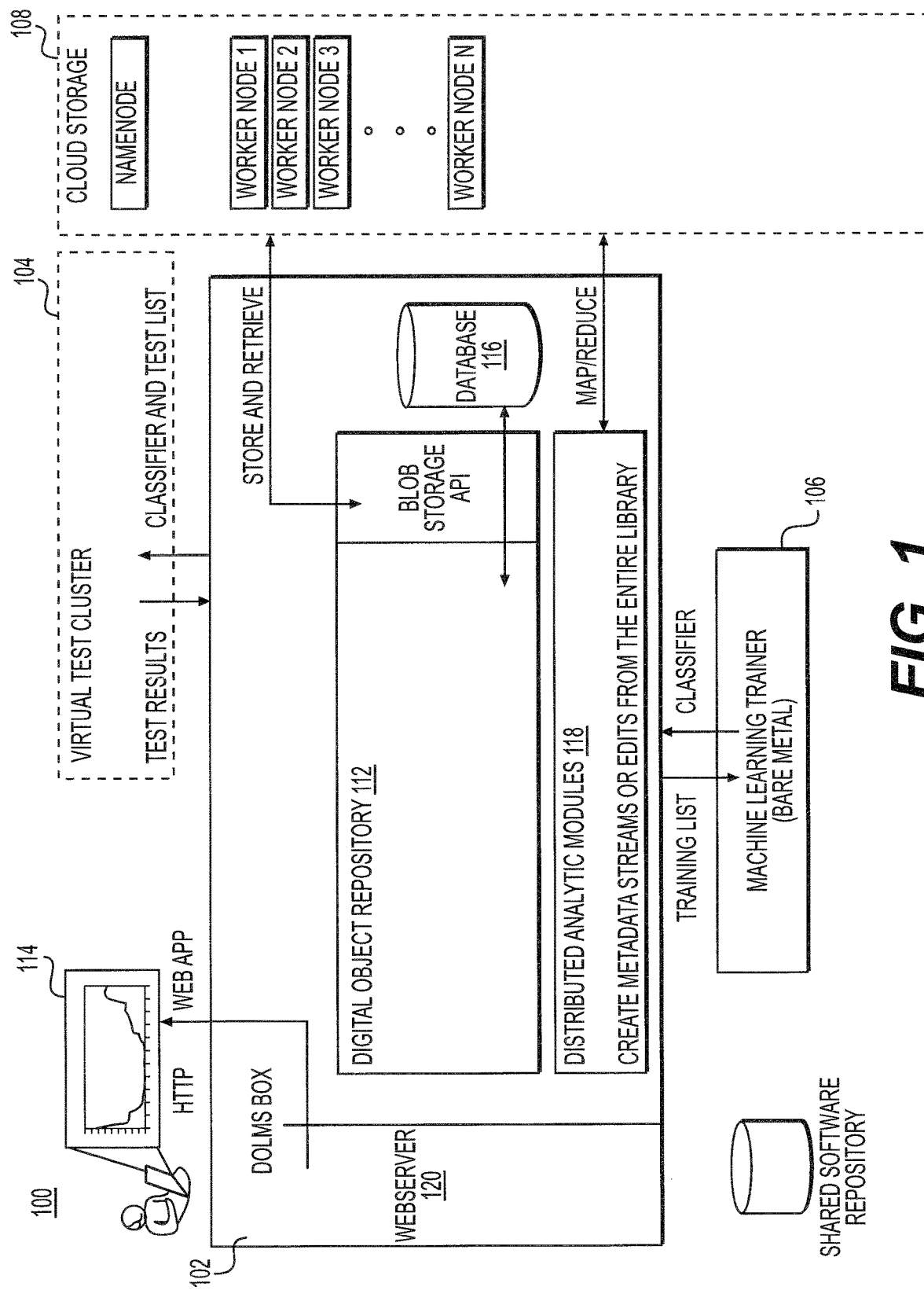
FIG. 1 is a block diagram illustrating an exemplary architecture of embodiments of the digital object library management system for machine learning applications.

Described herein are embodiments of a digital object library management system and method for machine learning applications. Embodiments a digital object library management system and method for machine learning applications address the challenge of conducting supervised machine learning in a "big data" environment where hundreds of thousands to billions of training and test examples need to be considered and managed. As noted above, this is a historically new regime for machine learning which typically has operated in environments where training data was limited relative to training computational resources. Embodiments also allow users to understand and control training sample bias. By revealing and managing training sample bias, embodiments allow users to tailor classifiers to particular operating environments or build balanced classifiers applicable across a wide variety of operating environments. In addition, embodiments allows users to enforce quality criteria on the training and test set members, and construct new metafeatures using distributed analytics.

The digital object library management system and method for machine learning applications provide a mechanism for efficiently managing, developing, and evaluating supervised or semi-supervised machine learning-based classification models based on massive datasets using a database and computer processing environment. In other words, embodiments are used to train classifiers or classification models used with maching learning applications. Embodiments manage a virtual library of digital objects used in the machine learning process, help automatically construct training and test sets, perform configuration management of artifacts resulting from model development and visualize model performance evaluations. One implementation of the digital object library management system and method for machine learning applications relates to managing the building of classifiers for malware detection. Such classififiers may be those described in U.S. patent application Ser. No. 14/038,682, entitled "System and Method for Automated Machine-Learning, Zero-Day Malware Detection," filed Sep. 26, 2013 ("the '682 application") and hereby incorporated in its entirety by reference.

The digital objects processed and managed by embodiments of the digital object library management system may generally be anything represented by a fixed length binary sequence. In embodiments described herein, the digital objects are binary blobs; i.e., a repository of a sequence of bits without structure. There are generally two types of objects used in embodiments of the digital object library management system: a content blob and a metadata blob. Generally speaking, the content blobs, or objects, are files while the metadata blobs, or objects, include information describing an associated content blob. For example, the metadata objects may be XML files that contain information about a content file, a plurality of content files, or one or more other metadata objects. The metadata objects will generally include info (e.g., a pointer) that references or points to the content object with which the metadata object is associated (i.e., which it describes).

The specific types of digital content objects used in a machine learning process and, therefore, stored in the library provided by embodiments of the digital object library management system, depend on the machine learning process or application with which the digital object library management system is used. For example, the digital content objects used with machine learning processes such as described in the '682 application may be files such as PE32 files, Linux executable files, audio files, document files, videos, etc. Content objects used in an image recognition machine learning process may be image files. In other words, the content objects stored in the library by embodiments of the digital object library management system may be virtually any type of file.

The information included in the digital metadata objects associated with the content objects will also depend on the machine learning process or application with which the digital object library management system is used. For example, in embodiments used with the machine learning processes such as described in the '682 application, the metadata object may contain information indicating whether content object file was malicious or benign, whether content object file belonged to a particular training or evaluation list, if evaluation a member of an evaluation list, what was the result of the evaluation, and other relevant information. In some embodiments, metadata objects may include extracted features (e.g., n-grams, header field values, length). In embodiments used with image recognition process, metadata object may contain image features. As noted above, digital metadata objects may be associated or linked with one or more digital content objects and/or one or more digital metadata objects.

The source of the objects generally depends on the nature of the application (e.g., malware detection will be very different from image processing, etc.) and one application may have many sources feeding the library.

Embodiments of the digital object library management system and method for machine learning applications allow users to construct training and test sets used in supervised machine learning processes from a very large library (e.g., tens of millions) of labeled digital objects using the object metadata fields and semantic relationships. Embodiments also maintain configuration and version control over all library objects, training and test sets, classifier models and test results.

In embodiments, the digital object library management system and method for machine learning applications integrates several existing technologies to solve the problem of managing "big data" for supervised machine learning. First, embodiments incorporate a digital object repository to manage training and test sample metadata and semantic relationships. Second, embodiments provide a cloud storage solution on which to run distributed analytics. Third, embodiments include a graphical user interface (GUI) that is tailored to assist users in controlling training bias in the machine learning process. Finally, embodiments combine the sample storage and metadata handling with a classifier and results configuration management system.

This improves on existing technologies by moving away from storing training and test sample metadata within the file path name to putting the training and test sample metadata in a searchable, extensible database. Embodiments automate the machine learning and testing processes. Also, embodiments move configuration management functions from spreadsheets to an automated service. This increased level of automation reduces user errors and time in developing and maintaining machine learning solutions.

With reference now to FIG. 1, shown is an architectural block diagram illustrating an exemplary architecture of a digital object library management system 100 for machine learning applications. Embodiments of system 100 include a three (3) subsystems: a central, digital object library management system (DOLMS) server 102; a test and training cluster of computers (shown here as a test cluster 104 and training cluster 106); and a storage cluster of computers 108. DOLMS server 102 may host several functional components of system 100, including digital object repository (DOR) software 112, a graphical user interface (GUI) software 114, database software 116, and distributed analytic modules 118. DOR software 112 may be implemented as, e.g., a Fedora Commons™ DOR and may include a Fedora Akurba™ API for communicating with storage cluster 108. GUI software 114 may be, e.g., a Django™ web app hosted by, e.g., a Tomcat™ web server 120 component of DOLMs server 102. Database software 116 may be implemented as, e.g., a PostgreSQL database. Distributed analytic modules 118 may be implemented as, e.g., distributed Pig™ analytic modules. DOLMs server 102 and its components may communicate with each other and other system 100 components using, e.g, EULFedora messages, HTTP, Map/Reduce messages and Akubra HDFS messages. In some instantiations, the DOLMS server 102 functions may be hosted on a single computer system (e.g., DOLMS server 102 may be implemented as a self-contained box) or distributed across multiple computer systems (e.g., hardware servers or virtual machines).

DOR 112 interfaces with storage cluster 108 to enable system 100 and users to access and manage libraries of digital objects. DOR 112 may include a metadata store, such as a FOXML metadata store. DOR is a conceptual framework that uses a set of abstractions about digital information to provide the basis for software systems that can manage digital information. Metadata is not stored in a database but is indexed for search. Data is accessed through access points (virtual data representations, including raw bit streams). Each access point has a URI. Custom access points can be created. DOR supports creation of digital object relationships (semantic graphs) among digital objects. An example: <is a member of the collection><hasMetadata>. A simple RDF schema is used. Object-to-object relationships are stored as metadata in digital objects within special datastreams.

With continuing reference to FIG. 1, test and training cluster may be instantiated as one, combined computer system or separate test cluster 104 and training cluster 106. Test and training cluster (e.g., separate test cluster 104 and training cluster 106) may be implemented as one or more virtual and physical computer systems that are used to conduct machine learning model generation and model test and evaluation in a distributed manner. Each element in test and training cluster may maintain a local store, or cache, of objects to reduce training and test time. Test and training cluster include and provide the logic for building a type of machine learning model. For example, test and training cluster may include logic supporting building of machine learning models per the machine learning algorithms and techniques described in the '682 application. A system 100 may include multiple test and training clusters associate therewith, each including or supporting logic for one or more types of machine learning techniques. In this manner, system 100 may support building of multiple machine learning models. In an embodiment test cluster 104 may be implemented as a virtual test cluster including a plurality of test virtual machines (VM1, VM2, VM3 . . . ). Each test virtual machine may include a file cache as shown. Training cluster 106 may be implemented as, e.g., a Bare metal trainer that includes a local file cache.

Storage cluster 108 may be implemented one or more machines that store digital content and metadata associated with the digital objects in the repository. In embodiments, storage cluster 108 may be implemented as a HDFS/Hadoop cloud. Such an embodiment may include a plurality of nodes: e.g., a name node and a plurality of worker nodes (e.g., 1 . . . n). Hadoop cloud is the storage backend for DOR 112, but is also directly accessible to analytic modules 118 (including, e.g., Pig analytic modules). Analytic modules 118 may create digital metadata objects managed by DOR 112. Storage cluster 108 stores and provides a library of the digital objects intended to be used in the machine learning process. This library includes a collection of the digital objects and associated metadata (which may also be stored as digital objects). In an embodiment, storage cluster 108 is implemented as cloud storage, as shown. Local storage on DOLMS server 102 may replace storage cluster 108 in some instantiations.

System 100 architecture may also include a shared software repository 122. Indeed, system 100 may include other components as are needed for particularly instantiations and implementations. FIG. 1 illustrates one possible architecture implementation.

In embodiments, system 100 also comprises a mechanism for copying, installing, configuring and updating required software components to all hardware components.

With continuing reference to FIG. 1, DOR 112 tracks and maintains configuration management of all digital objects loaded into or created by system 100. In addition, DOR 112 stores knowledge of semantic relations between the digital objects in database 116. DOR 112 makes objects and their associated metadata and semantic relations available for search and retrieval by users. In embodiments, DOR 112 has application programming interfaces (APIs) to interact with external databases, storage, search engines, and web servers. Instantiations may vary in their use of specific databases, storage, search engines, and web servers.

GUI 114 enables a user to configure DOR 112, manage objects in DOR 112, searching DOR 112, initiating machine learning training and testing on test and training cluster (e.g., training cluster 106 and testing cluster 104), and viewing test and evaluation results. In embodiments, GUI 114 is an application accessible via a user's web browser and is provided by web server 120 component of DOLM 102. GUI 114, in conjunction with DOR 112 and database 116, may be used to manage (create, edit, and delete) user accounts and privileges on system 100.

With continuing reference to FIG. 1, in embodiments distributed analytic modules 118 are a set of software programs, extensible by the user, that operate over the digital objects in the storage cluster 108 in order to generate new information regarding one or more digital objects (referred to as a collection). An analytic module 118 may create, read, edit or remove content, metadata or semantic relationships in a collection of digital objects. Analytic modules 118 may create new metadata streams or edit existing metadata about digital objects in the library. For example, an analytic module may calculate the number of occurrences of a particular byte sequence and store its results as a new metadata stream. In a separate example, an analytic may identify related digital objects using a similarity metric and edit relational metadata to reflect the outcome of this analysis. Analytic modules 118 may be configured to run on-demand or periodically.

An analytic module 118 may be constructed, e.g., using a MapReduce paradigm exemplified in Hadoop™ to enable it to be run concurrently on multiple nodes of the distributed storage cluster 108. For example, analytic modules 118 may be implemented as Pig analytic modules 118. Pig analytic modules 118 may include a file load and extensible analysis scripts that run on files. In a malware analysis application, the analytic modules 118 may attempt to discover similar or reused parts of files. Hadoop is a distributed computing framework provided by Apache. Hadoop provides a set of algorithms for distributed storage and distributed processing of very large data sets (big data) on computer clusters built from commodity hardware. Two main components of Haddop are a storage component (Hadoop Distributed File System (HDFS)) and a processing component (MapReduce). Hadoop divides files into large blocks (e.g., 64 MB or 128 MB) and distributes the blocks to nodes in storage cluster 108. In order to process the data, Hadoop MapReduce transfers code to nodes in storage cluster 108 that have the required data, which the nodes then process in parallel. Distributed databases, such as H-base, may be run in conjunction with Hadoop to improve access to small file objects. This approach takes advantage of data locality to allow the data to be processed faster and more efficiently via distributed processing than by using a more conventional supercomputer architecture that relies on a parallel file system where computation and data are connected via high-speed networking.

Embodiments of the digital object library management system 100 for machine learning applications described herein are used for the controlled construction and evaluation of supervised machine learning classifier models. A classifier model includes decision logic resulting in the assignment of an unknown instance to one of the object classes defined by the model. Decision logic is based on a set of features within the object. Feature definition and selection/reduction may occur dynamically as part of the training process or be statically defined by the user prior to training. The digital object library management system 100 for machine learning applications may be used for developing a classifier model based on a set of labeled training instances, i.e., supervised machine learning, but is not specific or limited to any individual or type of machine learning. Many different algorithms and processes for supervised or semi-supervised machine learning may be used within embodiments of system 100. An embodiment of system 100 may incorporate one or more approaches to supervised machine learning within the training and test cluster.

With continuing reference to FIG. 1, a user may upload digital objects to DOR 112 via the GUI 114 or via a DOR API (not shown). For example, GUI 114 may enable user to select digital objects resident on a local machine, network, networked systems or other sources. Alternatively, DOR API may detect digital objects in a known storage location and uploaded them. Object metadata is constructed, e.g., by DOR 112, on ingest and associated, e.g., by DOR 112, with the new, uploaded digital object. Object metadata may be stored as a separate object that is linked (e.g., through pointers) to the uploaded digital object as described herein. Common metadata fields include time of creation of the object, time of ingest, source, known classification, object size and quality measures related to the content and features for machine learning. The metadata may include information regarding relationships between and amongst the digital objects. The metadata may be constructed based on user inputs through, e.g., GUI 114 or based on automated determinations. Existing digital objects may have their metadata appended via the DOR API, if necessary. A sample file may be uploaded via the GUI 114 and manually associated with a test list object. Both the object content and metadata are stored in storage cluster 108.

When objects of all classes have been added to the library, the supervised machine learning process may begin. The supervised machine learning process constructs and verifies models used in a machine learning process to classify unknown objects into one or more categories. In the supervised machine learning process, a user constructs queries (e.g., SQL queries) based on the metadata and configures training and test set properties using GUI 114. Training and test set properties include elements such as set size and desired distribution of entries among the classes. Complex queries are used to restrict training and test set membership based on values of object metadata. For example, users may wish to construct training lists by building a query which selects objects of a particular filetype (e.g., filetype==PDF) that were created after a given date (e.g., DATE>=01012014) and were not sourced from their enterprise (e.g., SOURCE !=My Company) and contains an equal mix of benign and malicious samples (e.g., BENIGN_RATIO==0.5). Generated training and test sets are entered into DOR 112 and semantic relationships are created between the sets and their constituent member objects.

Once test and training sets are constructed, a user can initiate classifier generation on the training and test cluster (e.g., on training cluster 106). In a representative implementation, a training list is used to copy appropriate objects from storage cluster 108 and place them on the training cluster 106 node or nodes (nodes not shown). Alternatively, training cluster 106 node(s) may access the training objects from storage cluster 108. Training may be accomplished per the specific machine learning technique used (e.g., see the '682 application). System 100 may include a plurality of machine learning algorithms or techniques. Users may select from a variety of machine learning algorithms incorporated into system 100. Examples of such machine learning algorithms include the algorithms described in the '682 application as well as other naïve bayes, decision tree, random forests, and artificial neural network algorithms. Once training is complete, the resultant model/classifier is entered into DOR 112 with semantic relationships established between the training classifier and the training list and the objects therein. Semantic relationships may be represented in the object metadata as a field of form similar to <memberOf>, <derivedFrom>, <similarTo> or <contains>.

Multiple models/classifiers may be trained simultaneously and combined into ensemble classifiers or classifier bundles. The one or more classifiers generated may be generated on multiple computers simultaneously. Test sets may then be used to evaluate the classifier. A test set may or may not include digital objects from the training set. System 100 may test the classifier on multiple computers simulataneously. Once results of the evaluation are complete, the metadata of the classifier in DOR 112 is updated with semantic relationships established between the classifier and the test list and the objects therein.

Users may then access results via GUI 114 to retrieve classifiers, view test results and edit training lists. In addition, GUI 114 may provide statistics regarding the full content of the library showing breakouts by data source, time and object class among other metadata fields. In embodiments, GUI 114 facilitates digital object contributions via a web portal from authorized external parties.

In embodiments, the digital object library management system 100 may be used to assist in constructing and maintaining machine learning models to classify benign software from malicious software. Large numbers of known benign and malicious software are stored in the library (e.g., in storage cluster 108). Classifiers may be generated on a per file-type basis using metadata about each file to determine if it should be included in training or test sets. Classifiers are managed and updated over time as new samples are collected. As classifiers are generated, test results are reviewed to ensure proper performance or to test new learning mechanisms, feature sets or feature selection algorithms.

Figure 2:
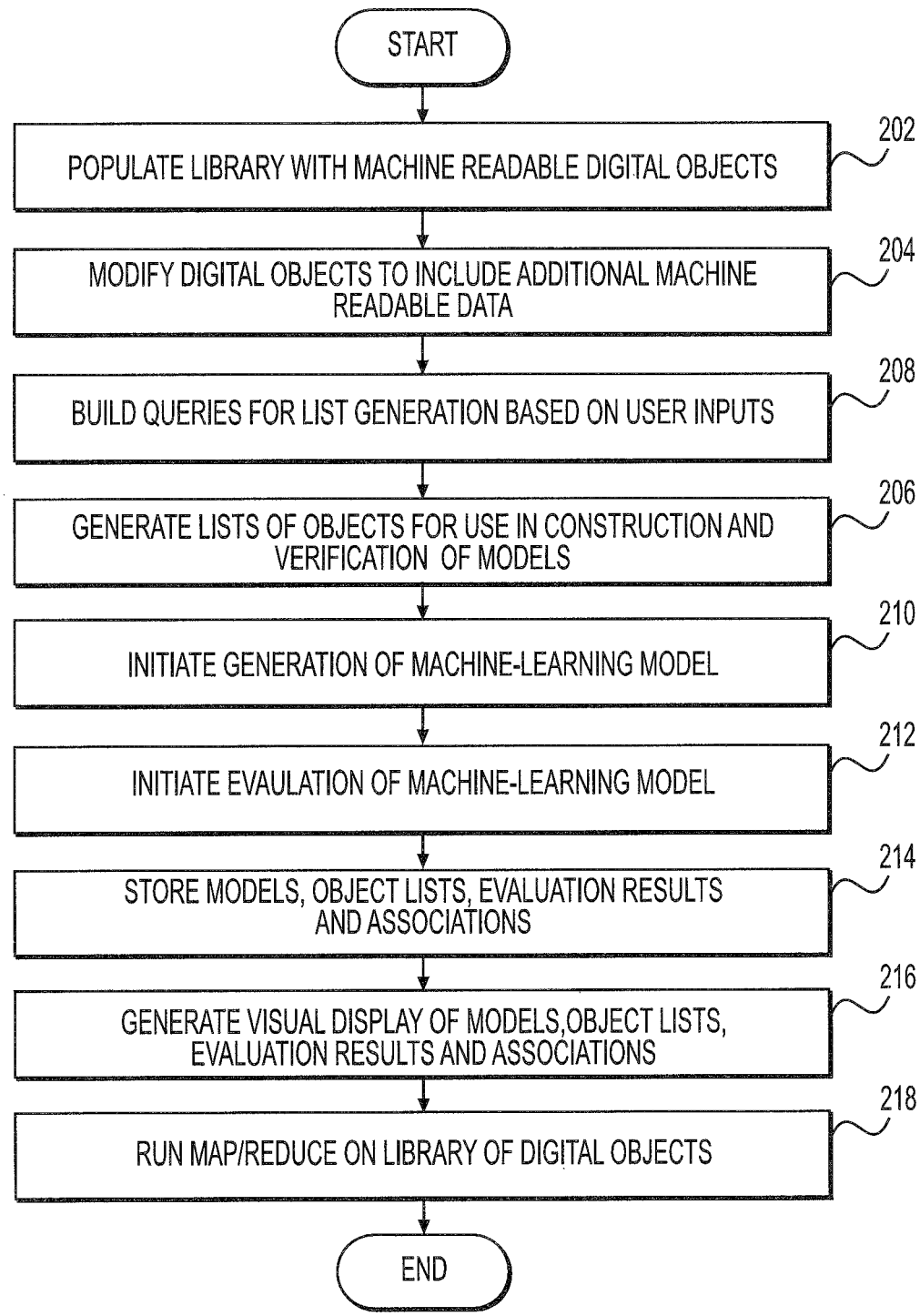
FIG. 2 is a flowchart illustrating an embodiment of a method for digital object library management for machine learning applications.
Figure 3:
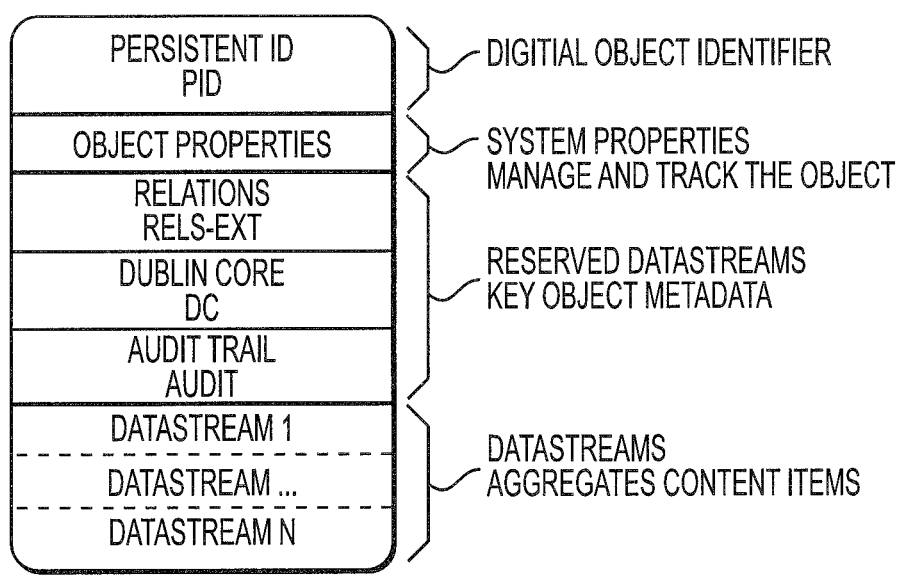
FIG. 3 is a representation of an exemplary digital object.

With reference now to FIG. 2, shown is a flowchart illustrating an embodiment of a method 200 for training and testing machine learning models. Method 200 is a method for digital object library management for machine learning applications that may be implemented or executed by and using embodiments of digital object library management system for maching learning applications, such as system 100 illustrated in FIG. 1. Method 200 populates a library, which may be stored in storage cluster 108, with a plurality of machine readable digital objects, block 202. The digital objects may be selected and uploaded into library (e.g., into storage cluster 108) using GUI 114 and/or DOR API as described above. In embodiments, the digital objects are content objects, such as files (e.g., P32 files, executable files, audio files, document files, image files, etc.). The digital objects in the populated library may be modified to include additional machine readable data, e.g., metadata, about or otherwise describing the digital objects and relationships between and among the digital objects, block 204. Modifying 204 the digital objects to include metadata may include system 100 creating digital metadata objects that are associated with one or more of the digital content objects with which library is populated 202. Alternatively, modifying 204 may utilize or take advantage of a DOR 112 interface. In a still further alternative, populating 202 may include the creating and storing of digital metadata objects in storage cluster 108 and modifying 204 may include the editing/modifying of the already existent digital metadata objects. Either way, modifying 204 may be performed by system 100 based on received user inputs (e.g, received through GUI). With reference now to FIG. 3, shown is an example of a digital object with metadata created using an embodiment of system 100.

Once the library is populated 202 and objects modified 204 to include additional descriptive data, method 200 may generate lists of objects for use in construction and verification of models used to classify unknown objects into one or more categories, block 206. The generated lists may include a training list and test list of objects from the populated library. The lists may be generated 206 in separate steps, e.g., generating a training list (construction) and then generating a verification (test or evaluation) list. The lists may be generated 206 based on user selections and inputs made through GUI 114. For example, lists may be generated 206 based on queries that are built based on user inputs into GUI 114, block 208. These queries may be in the form of SQL or SQL-like query statements.

Method 200 may initiate the generation of one or more machine-learning models or training classifiers, block 210. Machine-learning models may be generated, e.g., using the construction (training) list and training cluster 106. As such, system 100 and method 200 may generate the one or more models. Training cluster 106 may include software code (instructions) necessary to generate machine learning models per particular machine learning algorithms and techniques. A model may include digital objects (listed in training list) that are (or a are more likely than not) of a certain type (e.g., PDF, Windows executable, Linux executable, Microsoft Office files). A machine-learning model may be generated on a single computer or multiple computers simulataneously. This may be accomplished by training cluster 106 instantiated across a single computer or multiple computers.

With continuing reference to FIG. 2, after a machine-learning model is generated, method 200 may initiate testing or evaluating of the one or more machine-learning models, block 212. Machine-learning models may be tested, e.g., using verification (testing/evaluation) list and testing cluster 104. As such, system 100 and method 200 may test the one or more models. Testing cluster 104 may include software code (instructions) necessary to test machine learning models per particular machine learning algorithms and techniques. The testing may determine, using digital objects known to be of a certain type (e.g., PDF, Windows executable, Linux executable, Microsoft Office files). The digital objects used for the evaluation may be from a testing list, e.g., selected by a user using the digital object library management system. The one or more machine-learning models may be tested on a single computer or multiple computers simultaneously. This may be accomplished by testing cluster 104 instantiated across a single computer or multiple computers. When evaluating the machine-learning model, system 100 may produce evaluation results. The evaluation results, which may be displayed to a user through GUI 114, indicate the effectiveness of the machine-learning model (e.g., whether model correctly predicts class of samples).

Method 200 may also store models, object lists, evaluation results and associations among these digital objects, block 214. Models, object lists, evaluation results and these associations may be stored 214 in storage cluster 108. Such items may be stored, for example, through the use of metadata digital objects that contain information pointing to and associating the digital objects (i.e., constant objects) in various object lists (e.g., training list or evaluation list) together, information indicating the evaluation results of given digital objects in an evaluation list, etc. Method 200 may also generate a visual display of object metadata, object lists, relational information and evaluation results, block 216. Web server 120 may generate visual display. The generated 216 visual display may be displayed by GUI 114, e.g., to user on user's work station. Method 200 may also run distributable algorithms across the library of digital objects, block 218. For example, method 200 may run 218 map/reduce algorithms across the library of digital objects. Map/reduce algorithms may search for relationships among the digital objects (e.g., content objects), generate metadata about a subset of the objects, or generate statistics about the library of objects. Map/reduce algorithms leverage the physical distribution of the library over multiple physical servers to reduce analysis time.

Figure 4:
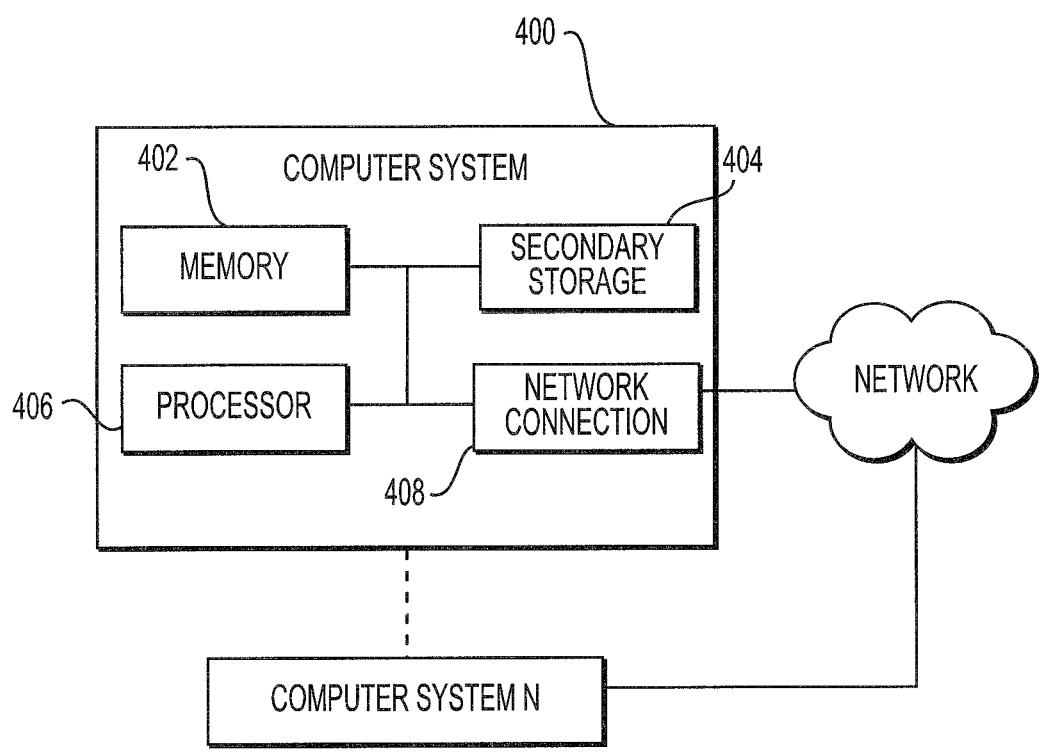
FIG. 4 is a block diagram of computer system components of an embodiment of a digital object library management system for machine learning applications.

With reference now to FIG. 4, shown is exemplary computer system components of an embodiment of a digital object library management system for machine learning applications. Server 400 typically includes a memory 402, secondary storage device 404, processor 406 a network connection 408. System 400 may also include a display (not shown) for displaying GUI and other interfaces. Memory 402 may include RAM or similar types of memory, and may host or store one or more applications (e.g., applications necessary to provide DOLMS server and its DOR, GUI, database and distributed analytic modules, testing and training cluster and storage cluster) for execution by processor 406. Secondary storage device 404 may include a hard disk drive or other types of non-volatile data storage that more permanently stores the applications. Processor 406 executes the applications which are stored in memory 402 or secondary storage 404, or received from the Internet or other network. Network connection 408 may include any type of connection for connecting to networks or external devices (e.g., USB or Ethernet connections).

Server 400 may store a database in secondary storage 404, for example, for storing and maintaining information need or used by the applications. Also, processor 406 may execute one or more software applications in order to provide the functions described in this specification, specifically in the methods described above, and the processing may be implemented in software, such as software modules, for execution by computers or other machines. The processing may provide and support web pages and other GUIs, such as GUI 114 described above. The GUIs may be formatted, for example, as web pages in HyperText Markup Language (HTML), Extensible Markup Language (XML) or in any other suitable form for presentation on a display device.

Although server 400 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices. The computer-readable media may include instructions for controlling a computer system, such as server 400, to perform a particular method. Server 400 may be part of a bladed server system intended to perform the functions and methods described herein.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A method comprising:
generating, for a plurality of files, metadata indicating one or more properties of the plurality of files;
determining, based on the metadata and one or more criteria, a first portion of the plurality of files;
training, based on the first portion of the plurality of files, one or more machine learning models; and
determining, based on the one or more machine learning models, a classification for a file from a second portion of the plurality of files.

2. The method of claim 1, wherein the generating the metadata comprises determining at least one feature associated with the plurality of files and a similarity metric indicating a number of occurrences of the at least one feature in the plurality of files.

3. The method of claim 2, wherein the at least one feature comprises at least one of an n-gram, a header field value, image data, or a file length.

4. The method of claim 1, wherein the one or more machine learning models is based on at least one machine learning algorithm comprising a naive bayes classifier, a decision tree, a random forest, or a neural network.

5. The method of claim 1, wherein the training the one or more machine learning models is performed on a first cluster of computers and the plurality of files is stored on a second cluster of computers.

6. The method of claim 1, wherein the generating the metadata is based on receiving a user input comprising at least a portion of the properties.

7. The method of claim 1, further comprising:
determining, based on the one or more criteria, at least that the first portion are of a same file-type.

8. The method of claim 7, wherein the second portion of the plurality of files are of the same file-type.

9. The method of claim 1, wherein the classification comprises at least malign or benign.

10. The method of claim 1, further comprising:
determining, based on the classification, an effectiveness of the generated one or more machine learning models; and
causing display of data indicating the effectiveness and the metadata.

11. The method of claim 1, wherein the plurality of files comprises at least one of a video file, an audio file, a document file, or an executable file.

12. The method of claim 1, wherein the one or more criteria restrict membership in the first portion based on values of the metadata to control training bias in the first portion.

13. A device comprising:
one or more processors; and
memory storing instructions that, when executed by the one or more processors, cause the device to:
generate, for a plurality of files, metadata indicating one or more properties of the plurality of files;
determine, based on the metadata and one or more criteria, a first portion of the plurality of files;
train, based on the first portion of the plurality of files one or more machine learning models; and
determine, based on the one or more machine learning models, a classification for a file from a second portion of the plurality of files.

14. The device of claim 13, wherein the generating the metadata comprises determining at least one feature associated with the plurality of files and a similarity metric indicating a number of occurrences of the at least one feature in the plurality of files.

15. The device of claim 14, wherein the at least one feature comprises at least one of an n-gram, a header field value, image data, or a file length.

16. The device of claim 13, wherein the instructions, when executed by the one or more processors, further cause the device to:
determine, based on the one or more criteria, at least that the first portion are of a same file-type.

17. The device of claim 13, wherein the classification comprises at least malign or benign.

18. The device of claim 13, wherein the one or more criteria restrict membership in the first portion based on values of the metadata to control training bias in the first portion.

19. A non-transitory computer-readable storage medium storing computer-readable instructions that, when executed by a processor, cause:
generating, a plurality of files, metadata indicating one or more properties of the plurality of files;
determining, based on the metadata and one or more criteria, a first portion of the plurality of files;
training, based on the first portion of the plurality of files, one or more machine learning models; and
determining, based on the one or more machine learning models, a classification for a file from a second portion of the plurality of files.

20. The non-transitory computer-readable storage medium of claim 19, wherein the generating the metadata determining at least one feature associated with the plurality of files and a similarity metric indicating a number of occurrences of the at least one feature in the plurality of files.

21. The non-transitory computer-readable storage medium of claim 20, wherein the at least one feature comprises at least one of an n-gram, a header field value, image data, or a file length.

22. The non-transitory computer-readable storage medium of claim 19, wherein the classification comprises at least malign or benign.

23. The non-transitory computer-readable storage medium of claim 19, wherein the one or more criteria restrict membership in the first portion based on values of the metadata to control training bias in the first portion.

* * * * *